(12) United States Patent
Tada

(10) Patent No.: US 10,308,230 B2
(45) Date of Patent: Jun. 4, 2019

(54) ELECTRIC PARKING BRAKE DEVICE

(71) Applicant: IGARASHI ELECTRIC WORKS LTD., Kanagawa (JP)

(72) Inventor: Junichi Tada, Kanagawa (JP)

(73) Assignee: IGARASHI ELECTRIC WORKS LTD (JP)

( * ) Notice: Subject to any disclaimer, the term of this patent is extended or adjusted under 35 U.S.C. 154(b) by 0 days.

(21) Appl. No.: 15/311,389

(22) PCT Filed: Nov. 13, 2015

(86) PCT No.: PCT/JP2015/082047
§ 371 (c)(1),
(2) Date: Nov. 15, 2016

(87) PCT Pub. No.: WO2017/081827
PCT Pub. Date: May 18, 2017

(65) Prior Publication Data
US 2018/0236991 A1    Aug. 23, 2018

(51) Int. Cl.
*B60T 13/74* (2006.01)
*F16D 65/18* (2006.01)
(Continued)

(52) U.S. Cl.
CPC ........... *B60T 13/741* (2013.01); *B60T 13/74* (2013.01); *F16D 65/18* (2013.01); *H02K 11/21* (2016.01);
(Continued)

(58) Field of Classification Search
CPC ........ B60T 13/74; B60T 13/741; B60T 7/107; B60T 7/042; B60T 7/085; B60T 8/885;
(Continued)

(56) References Cited

U.S. PATENT DOCUMENTS 3,419,087 A * 12/1968 Amtsberg ............. B25B 23/147
173/178
3,772,579 A * 11/1973 Stone ........................ B66B 1/06
318/742

(Continued)

FOREIGN PATENT DOCUMENTS

JP     08-136211 A     5/1996
JP     11-325964 A    11/1999
(Continued)

*Primary Examiner* — Bradley T King
*Assistant Examiner* — Mahbubur Rashid
(74) *Attorney, Agent, or Firm* — Skinner and Associates; Joel Skinner

(57) ABSTRACT

The electric parking brake device comprising a resolver which has a base arranged in a housing so as to face a rotating plate fixed to a rotation axis of an electric motor, wherein a first sheet coil comprising a detecting coil and a second sheet coil comprising a primary coil of an output transformer coupled to a detecting coil are arranged on the opposite face of the rotating plate, and
wherein a third sheet coil comprising a excitation coil opposite to the detecting coil and a fourth sheet coil comprising a secondary coil of an output transformer opposite to the primary coil of the output transformer are arranged on the opposite face of the base.

11 Claims, 6 Drawing Sheets

(51) Int. Cl.
*H02P 29/00* (2016.01)
*H02K 11/21* (2016.01)
*H02P 29/40* (2016.01)

(52) U.S. Cl.
CPC .............. *H02P 29/00* (2013.01); *H02P 29/40* (2016.02); *B60T 2270/84* (2013.01)

(58) Field of Classification Search
CPC ... B60T 17/22; B60T 8/17; H02P 3/04; B60L 7/24; B60L 7/28; F16D 2127/06; F16D 65/18; F16D 2065/386; F16D 2129/10; F16D 28/00
USPC ........................................................ 188/162
See application file for complete search history.

(56) References Cited

U.S. PATENT DOCUMENTS

| | | | | |
|---|---|---|---|---|
| 3,832,894 A * | 9/1974 | Pelta | .................... | G01M 15/044 73/116.06 |
| 3,847,251 A * | 11/1974 | Maltby | .................... | B66C 13/23 187/292 |
| 4,666,021 A * | 5/1987 | Messersmith | ............. | B60T 7/04 188/181 T |
| 5,107,967 A * | 4/1992 | Fujita | ...................... | B60T 1/065 188/156 |
| 5,769,189 A * | 6/1998 | Heibel | .................. | B60T 11/046 188/106 P |
| 5,931,268 A * | 8/1999 | Kingston | ............ | F16D 65/0006 188/158 |
| 5,971,110 A * | 10/1999 | Martin | .................... | F16D 65/18 188/158 |
| 6,000,507 A * | 12/1999 | Bohm | .................. | B60T 13/741 188/1.11 E |
| 6,003,640 A * | 12/1999 | Ralea | .................... | B60T 8/1703 188/1.11 L |
| 6,012,556 A * | 1/2000 | Blosch | .................. | F16D 41/206 188/158 |
| 6,139,117 A * | 10/2000 | Shirai | .................... | B60T 13/74 188/1.11 R |
| 6,279,694 B1 * | 8/2001 | Bohm | .................... | B60T 13/74 188/1.11 E |
| 6,293,370 B1 * | 9/2001 | McCann | ................. | B60T 1/065 188/1.11 E |
| 6,382,741 B1 * | 5/2002 | McCann | ................. | B60T 1/005 188/265 |
| 6,397,977 B1 * | 6/2002 | Ward | .................... | F16D 55/227 188/1.11 E |
| 6,679,355 B2 * | 1/2004 | Suzuki | .................... | B60T 13/74 188/156 |
| 8,310,228 B2 * | 11/2012 | Miyazaki | ............... | H02K 24/00 310/216.004 |
| 8,710,829 B2 * | 4/2014 | Fukuda | .................... | G01B 7/30 324/207.15 |
| 8,723,510 B2 * | 5/2014 | Nakamura | ............... | G01B 7/30 324/207.15 |
| 2006/0176051 A1 * | 8/2006 | Miya | .................... | G01D 5/2086 324/207.25 |
| 2007/0199775 A1 * | 8/2007 | Yasukawa | ............. | B60T 13/741 188/73.1 |
| 2007/0228824 A1 * | 10/2007 | Yasukawa | ............... | B60T 13/02 303/171 |
| 2008/0071456 A1 * | 3/2008 | Shiraki | .................... | B60T 7/122 701/70 |
| 2009/0236157 A1 * | 9/2009 | Akamatsu | ............. | B60K 7/0007 180/55 |
| 2010/0117632 A1 * | 5/2010 | Miyazaki | ............... | G01D 5/208 324/207.25 |
| 2010/0321007 A1 * | 12/2010 | Fukuda | ................ | G01D 5/2093 324/207.25 |
| 2011/0043196 A1 * | 2/2011 | Fujita | .................... | G01D 5/2046 324/207.16 |
| 2012/0007592 A1 * | 1/2012 | Manabe | ................. | G01D 5/2073 324/207.25 |
| 2012/0200286 A1 * | 8/2012 | Kino | .................... | G01D 5/2073 324/207.16 |
| 2013/0054062 A1 * | 2/2013 | Matsushita | ............ | B60K 6/448 701/22 |
| 2013/0271122 A1 * | 10/2013 | Kino | .................... | G01D 5/2073 324/207.25 |
| 2013/0342192 A1 * | 12/2013 | Kanemitsu | ............. | G01D 5/208 324/207.25 |
| 2014/0262634 A1 * | 9/2014 | Yamasaki | ............... | F16D 55/00 188/72.1 |

FOREIGN PATENT DOCUMENTS

| | | | |
|---|---|---|---|
| JP | 2011017584 A | * | 1/2011 |
| JP | 2012-228024 A | | 11/2012 |
| JP | 2012-240632 A | | 12/2012 |
| JP | 2013-051825 A | | 3/2013 |
| JP | 2014-101973 A | | 6/2014 |
| JP | 2015-044424 A | | 3/2015 |

* cited by examiner

ELECTRIC PARKING BRAKE DEVICE

FIELD OF THE INVENTION

The present invention relates to an electric parking brake device.

BACKGROUND OF THE INVENTION

Because a conventional electric parking brake device (please see Patent Literature 1 or 2, etc.) operates a motor under open loop control, it is impossible to control a clamp position between brake pads and a brake disk, a clamp speed, etc. Moreover, in the case that a battery goes flat once and then restores, position information of a motor disappears, and it is impossible to distinguish between on state and off state of an electric parking brake.

Therefore, there is an idea to control a press amount of brake pads, a pressing speed, etc. by detecting a rotation frequency, etc. of a motor with a rotational angle detecting means such as a rotary encoder, a resolver, etc. installed into an electric parking brake device. However, a rotary encoder cannot withstand a severe environment in a vicinity of a vehicle wheel. Moreover, a conventional resolver (please see Patent Literature 3 or 4, etc.) is large in size, in particular, coil parts of it are thick. Thus, when a conventional resolver is installed into an electric parking brake device, the device is larger in size as a whole and is not suitable for a practical use. The fact is that an electric parking brake device is not delicately controlled except for an on/off control.

PRIOR ART

Patent Literatures

Patent Literature 1: JP 2015-044424 A
Patent Literature 2: JP 2014-101973 A
Patent Literature 3: JP 2013-051825 A
Patent Literature 4: JP 2012-228024 A

SUMMARY OF THE INVENTION

Objects of the Invention

In view of the above disadvantages of the conventional technique, an object of the invention is to provide an electric parking brake device of which coil parts are made thin to enable a resolver to be installed in the electric parking brake, and thereby of which a clamp position, a clamp speed, etc. of brake pads for a brake disk are enabled to be controlled.

Means for Solving the Problems

The above problems are solved by the present invention as follows.
(1) An electric parking brake device comprising an electric motor, a pressing member, and brake pads, wherein a rotational movement of a rotation axis of the electric motor installed in a housing is decelerated and is converted to a linear movement so as to be transmitted to the pressing member, wherein a brake disk rotating with a wheel is pressed with the brake pads biased by the pressing member so that a braking force is affected to the wheel, and wherein the electric motor is controlled by a controller; the electric parking brake device further comprising a resolver which has a rotating plate fixed to the rotation axis of the electric motor or an axis rotating synchronously with the rotation axis,
a base arranged in a housing so as to face the rotating plate,
a first sheet coil comprising a detecting coil and arranged on an opposite face of the rotating plate so as to face the base,
a second sheet coil comprising a primary coil of an output transformer and arranged on the opposite face of the rotating plate so as to face the base, the primary coil being coupled to the detecting coil,
a third sheet coil comprising an excitation coil opposite to the detecting coil and arranged on the opposite face of the base so as to face the rotating plate, and
a fourth sheet coil comprising a secondary coil of the output transformer opposite to the primary coil of the output transformer and arranged on the opposite face of the base so as to face the rotating plate,
wherein the controller has
a resolver control circuit comprising an input circuit for inputting an excitation signal to the excitation coil of the resolver and an output circuit for processing an output signal occurring from the secondary coil of the output transformer, and
a motor control circuit for controlling the electric motor based on an output from the output circuit of the resolver control circuit.

According to such a formation, the resolver can be made thin as a whole by making coil parts with sheet coils, thereby the resolver can be substantially installed in the electric parking brake, and it is possible to control a clamp position, a clamp speed, etc. of the brake pads for the brake disk.

(2) Regarding the above item (1), each coil of the first to fourth sheet coils is arranged one by one per one plain face.

According to such a formation, all of the sheet coils can be made thin, and thereby the resolver can be considerably made thin as a whole.

(3) Regarding the above item (1) or (2), the first and second sheet coils are respectively opposite to the third and fourth sheet coils, and these sheet coils are concentrically arranged around the rotation axis of the electric motor or the axis rotating synchronously with the rotation axis.

According to such a formation, the resolver can be further made thin as a whole.

(4) Regarding any one of the above items (1) to (3), the excitation coil consists of a first and second excitation coils which are respectively disposed on the front and rear surfaces of the third sheet coil such that the phases of the electrical angle of them are different from each other.

According to such a formation, the resolver can be further made thin, because the excitation coil consists of the first and second excitation coils such that the phases of the electrical angle of them are different from each other, and they are respectively disposed on the front and rear surfaces of the third sheet coil.

(5) Regarding any one of the above items (1) to (4); the deceleration of the rotational movement of the rotation axis of the electric motor is performed by a decelerating means comprising a worm and a worm wheel; the worm is formed in the rotation axis, and the worm wheel engages with the worm and is connected to a power conversion means for converting the rotational movement of the rotation axis to the linear movement; a load sensor for detecting a thrust load affecting in the axis direction of the rotation axis is installed in a housing; a torque control circuit for calculating a clamping force to the brake disk by the brake pads based on a torque detection signal given from the load sensor is installed in the controller; and the electric motor is controlled by the motor control circuit based on an output from the torque control circuit and an output from the output circuit of the resolver control circuit.

According to such a formation, not only a position and moving speed, etc. of the brake pads can be controlled, but also a clamping force to the brake disk by the brake pads can be controlled.

Effect of Invention

According to the present invention, by making coil parts thin, it is able to provide an electric parking brake device of which a resolver is enabled to be installed in the electric parking brake, and thereby of which a clamp position, a clamp speed, etc. of brake pads for a brake disk are enabled to be controlled.

EMBODIMENTS OF THE INVENTION

One embodiment of an electric parking brake device according to the present invention is described with drawings as follows.

FIGS. 1 to 5 show a first embodiment of an electric parking brake device of the present invention.

Figure 4:
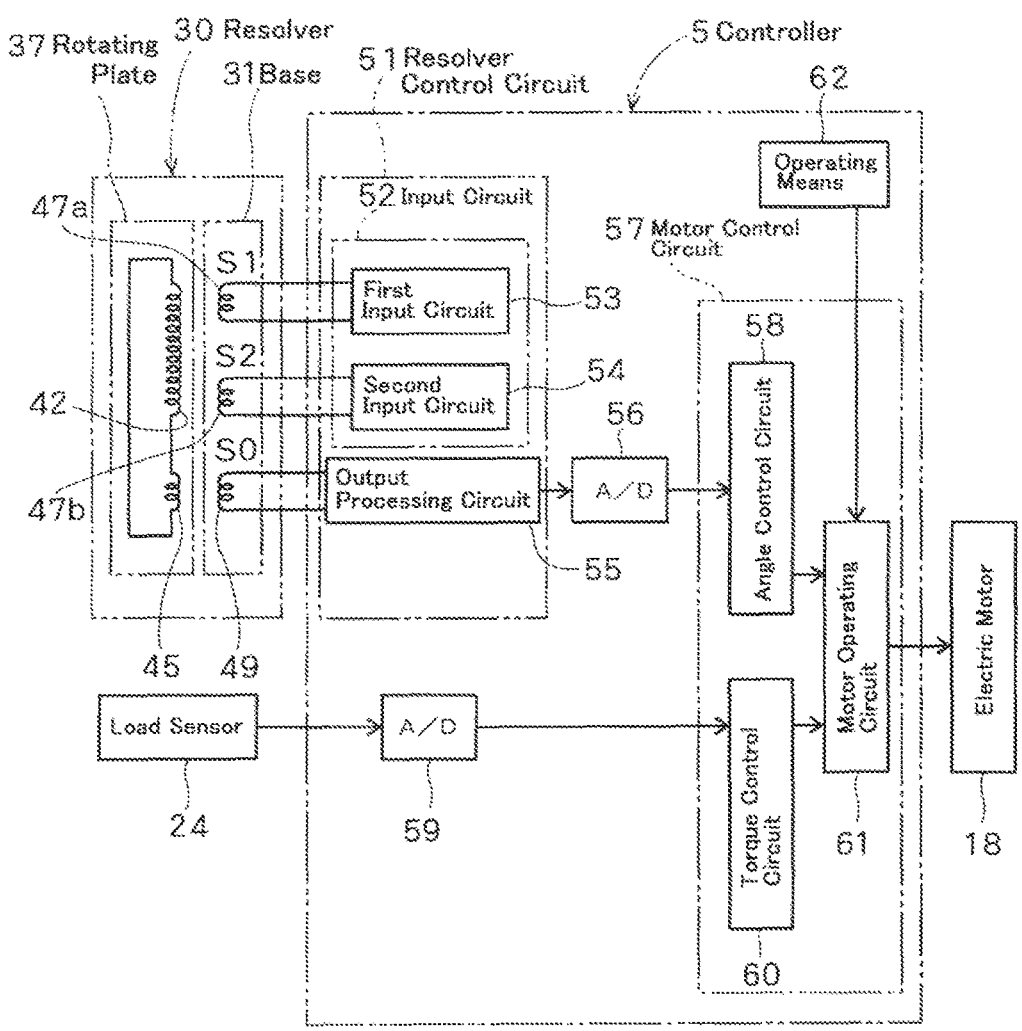
FIG. 4 is a block diagram of a controller in the first embodiment.

The electric parking brake device 1 is activated by operating a parking brake lever, a parking brake pedal or a parking brake switch (any of these being not shown) set on a driver's seat of a vehicle (see an operating means 62 in FIG. 4). The electric parking brake device 1 comprises a brake disk 2 rotating with a wheel (not shown) of the vehicle, a parking brake unit 3 fixed to the body (not shown) so as to stride over the brake disk 2, an electrical actuator 4 fixed to the side of the parking brake unit 3, and a controller 5 (see FIG. 4).

Figure 1:
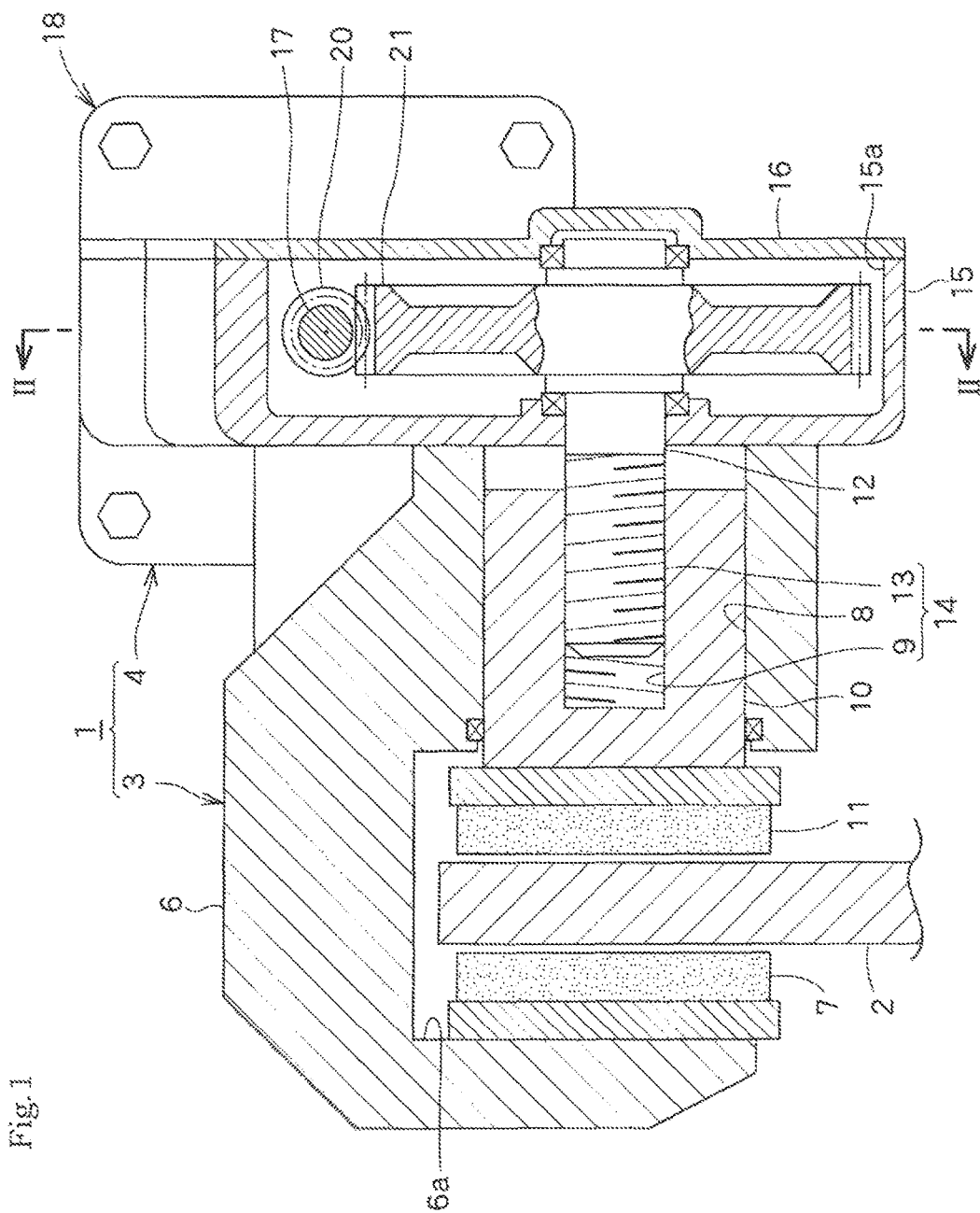
FIG. 1 is a schematic vertical sectional front view showing a first embodiment of an electric parking brake device of the present invention.
Figure 2:
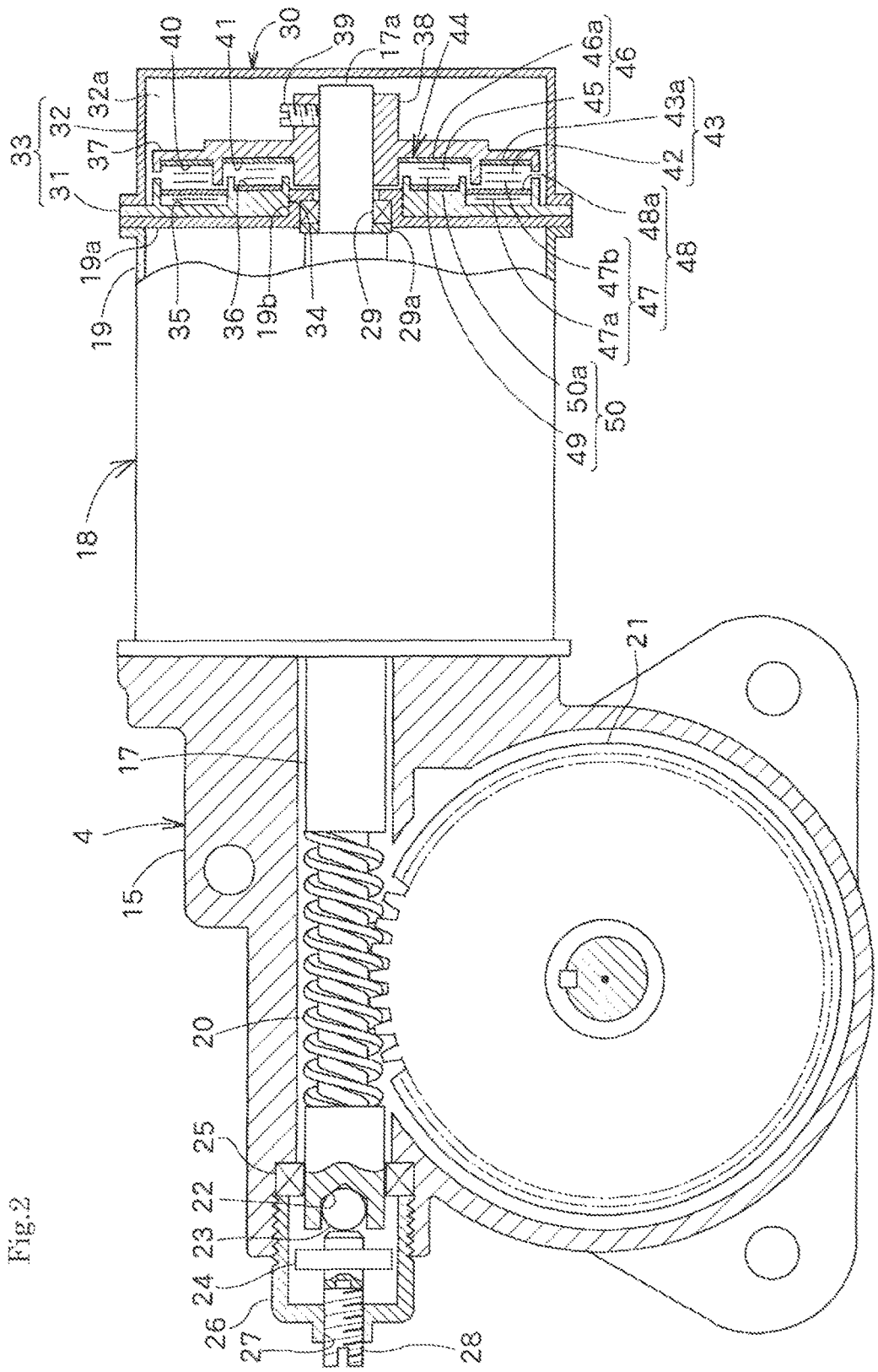
FIG. 2 is a schematic vertical sectional side view taken along the line II-II in FIG. 1.

FIGS. 1 and 2 schematically show the electric parking brake device 1 by omitting small parts to the degree that the working principle can be understood. As shown in these drawings; the parking brake unit 3 comprises a housing 6 formed in a portal shape and fixed to the body (not shown) so as to stride over the brake disk 2 and so as to be slightly movable in the axis direction of a rotation axis (not shown) of the brake disk 2;

a first brake pad 7 fixed to a portion opposite to a left side (in FIG. 1) of the brake disk 2 in an inner side of a recessed part 6a of the housing 6;

a cylinder 8 formed on a portion opposite to the right side (in FIG. 1) of the brake disk 2 in an inner side of the housing 6 so as to be arranged in the direction perpendicular to the right side of the brake disk 2;

a piston 10 fit in the cylinder 8 so as to be slidable in the inside-outside direction and be unrotatable, a female screw hole 9 being formed in the axis direction at the center of the piston 10; and a second brake pad 11 arranged on the edge of the piston 10 opposite to the right side (in FIG. 1) of the brake disk 2, the second brake pad 11 protruding into the housing 6 from the cylinder 8.

A male screw 13 formed on the tip of the output shaft 12 of the electrical actuator 4 is screwed to the female screw hole 9 of the piston 10. When the output shaft 12 is rotated in one direction, by screwing between the female screw hole 9 of the piston 10 and the male screw 13 of the output shaft 12, the piston 10 is advanced to the left in FIG. 1 and the second brake pad 11 is pressed to the right side (in FIG. 1) of the brake disk 2. Then, by the reaction between the piston 10 and the housing 6, the housing 6 is moved to the right in FIG. 1, and the first brake pad 7 is pressed to the left side (in FIG. 1) of the brake disk 2. Accordingly, a braking force is given to the wheel by holding the brake disk 2 between the first and second brake pads 7, 11.

When the output shaft 12 is rotated in the other direction, by screwing between the female screw hole 9 of the piston 10 and the male screw 13 of the output shaft 12, the piston 10 is withdrawn to the right in FIG. 1 and the second brake pad 11 is separated from the right side (in FIG. 1) of the brake disk 2. Then, by the reaction between the piston 10 and the housing 6, the housing 6 is moved to the left in FIG. 1, and the first brake pad 7 is separated from the left side (in FIG. 1) of the brake disk 2. Accordingly, the braking force to the wheel is released by separating the brake disk 2 from the first and second brake pads 7, 11.

Apparent from the above operation, the piston 10 functions as a pressing member for pressing the second brake pad 11 to the right side (in FIG. 1) of the brake disk 2, and also functions as a power conversion means 14 for converting a rotational movement of the output shaft 12 of the electrical actuator 4 into a linear movement so that the linear movement is transmitted to the pressing member by the female screw hole 9 of the piston 10 and the male screw 13 of the output shaft 12.

The electrical actuator 4 comprises a housing 15 fixed to the housing 6 of the parking brake unit 3;

a cover plate 16 forming a part of the housing 15 and capable of closing an opening 15a of the housing 15 detachably;

the above described output shaft 12 supported rotatably by the housing 15 and the cover plate 16, wherein a part of this shaft penetrates the housing 6 so as to protrude into the cylinder 8 of the housing 6 of the parking brake unit 3;

an electric motor 18 provided as a DC servo motor which is fixed to the housing 15 so as to be separated from the output shaft 12, and of which the rotation axis 17 is perpendicular to the output shaft 12;

a worm 20 provided integrally with the rotation axis 17 of the electric motor 18, wherein the worm 20 protrudes to the left in FIG. 2 from the motor housing 19 of the electric motor 18; and a worm wheel 21 engaging with the worm 20 and fitted to the output shaft 12 in the housing 15.

A recessed groove 22 is formed at the center of the end face in the left (in FIG. 2) of the rotation axis 17. The tip of the rotation axis 17 is in pressure contact with a load sensor 24 by a ball 23 fitted in the recessed groove 22.

The load sensor 24 is arranged in an endcap 26 which is screwed to the housing 15 so as to press a radial bearing 25 rotatably supporting the left end of the rotation axis 17.

The right edge of an adjusting screw 28 screwed to a female screw hole 27 formed at the center of the endcap 26 is in pressure contact with the tip of the load sensor 24, and the load sensor 24 is able to detect a thrust load affecting to the right edge of the adjusting screw 28.

A small diameter axis 17a is successively formed from the right end of the rotation axis 17, wherein the small diameter axis 17a penetrates an end wall 19a of the motor housing 19 of the electric motor 18 and projects to the right in FIG. 2. A radial thrust bearing 29 is arranged inside of a boss part 19b which is the penetrating part for the small diameter axis 17a at the center of the end wall 19a.

Incidentally, because the inner structure of the electric motor 18 does not directly concern the present invention, the detailed explanation and the drawings of it are omitted.

A cushion 29a made of an elastic body is fitted on the outside of the small diameter axis 17a between the radial thrust bearing 29 and the right end of the rotation axis 17.

Within a permissible range of the elastic deformation of the cushion 29a, the rotation axis 17 is movable in the axis direction. When the rotation axis 17 is moved to the left in FIG. 2; the load sensor 24 is able to detect the thrust load of the rotation axis 17, torque fluctuation of the rotation axis 17, the worm 20 and the worm wheel 21, and pressing force fluctuation of the first and second brake pads 7, 11 to the brake disk 2, that is, braking force fluctuation to the wheel.

The cushion 29a is made of the elastic body like a rubber, or is made of a disc spring which is deformable with a weak force.

Moreover, as an alternative to omission of the cushion 29a, only a micro gap of which a level is visually unrecognizable can be formed between the right end of the rotation axis 17 and the end wall 19a of the motor housing 19 or the radial thrust bearing 29.

A resolver 30 is provided on the right end (in FIG. 2) of the motor housing 19 of the electric motor 18.

The resolver 30 has a resolver housing 33 comprising a base 31 fixed to the end wall 19a of the motor housing 19 and a cover 32 of which the peripheral part is fixed to the base 31 and in which a shallow round hollow part 32a is formed.

Figure 3:
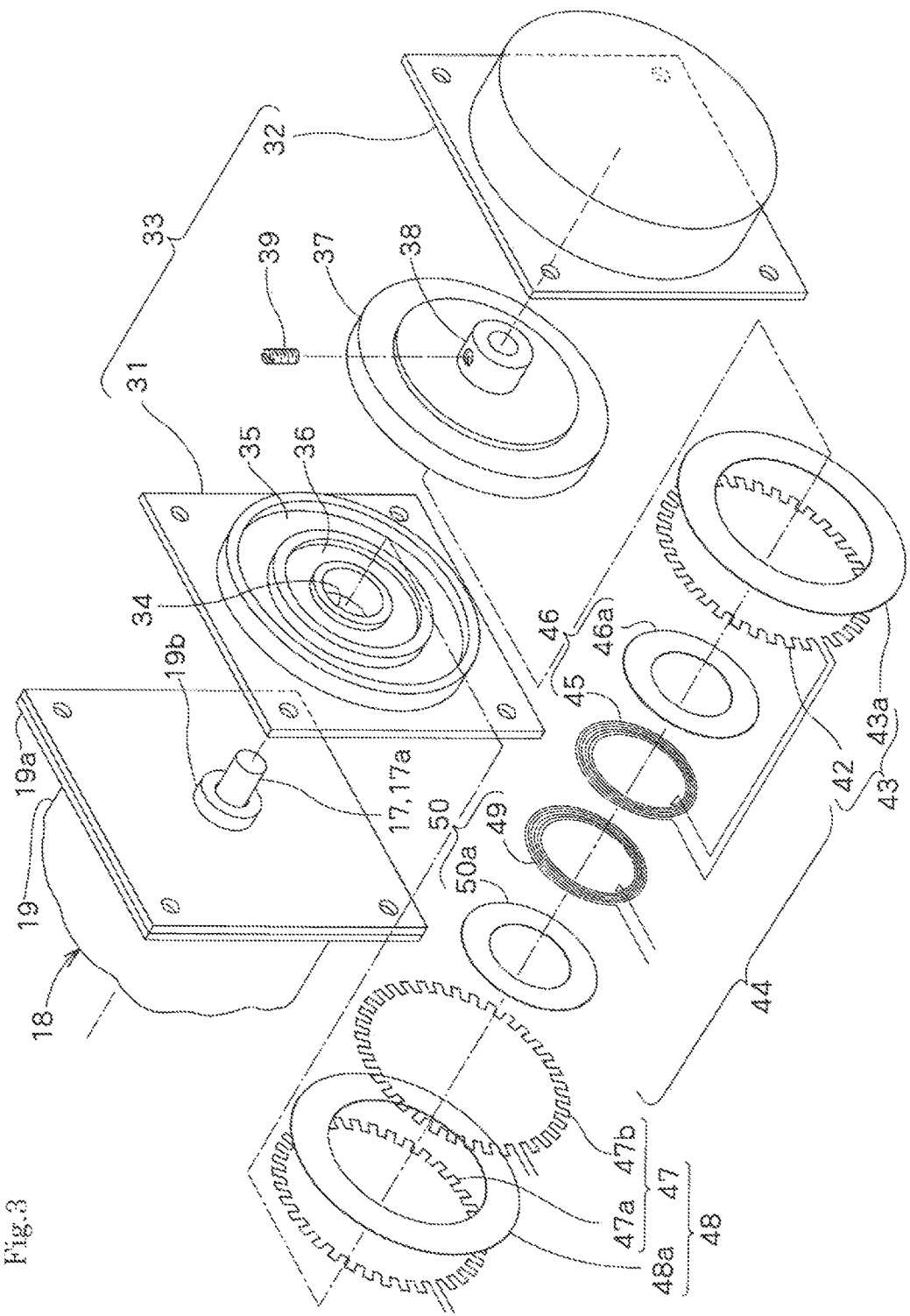
FIG. 3 is a schematic exploded perspective view of an end part of an electric motor and a resolver in the first embodiment.

As shown in FIGS. 2 and 3, a fitting hole 34 to which a boss part 19b of the motor housing 19 can be fixed is formed at the center of the base plate (base) 31 made of iron.

Shallow circular sheet-coil-holding grooves 35, 36 of which the diameters are different from each other are concentrically formed around the fitting hole 34 on the right side of the base plate 31.

The bottom face of the outer sheet-coil-holding groove 35 is arranged nearer to the electric motor 18 than the bottom face of the inner sheet-coil-holding groove 36.

A rotating plate 37 opposite to the base plate 31 is arranged in the hollow part 32a of the resolver housing 33 by fitting a boss part 38 formed at the center of the rotating plate 37 to the small diameter axis 17a projecting to the hollow part 32a and fixing the boss part 38 with a setscrew 39.

Shallow circular sheet-coil-holding grooves 40, 41 of which the diameters are different from each other are concentrically formed around the boss part 38 on the left side of the rotating plate 37.

The bottom face of the outer sheet-coil-holding groove 40 is arranged nearer to the base plate 31 than the bottom face of the inner sheet-coil-holding groove 41.

As shown in FIGS. 2 and 3, a first sheet coil 43 comprising a detecting coil 42 is stored in the sheet-coil-holding groove 40 on the opposite face of the rotating plate 37 facing the base plate 31, and a second sheet coil 46 comprising a primary coil 45 of an output transformer 44 is similarly stored in the sheet-coil-holding groove 41, wherein the primary coil is coupled to the detecting coil 42.

Namely, the first and second sheet coils 43, 46 are concentrically arranged around the small diameter axis 17a on the opposite face of the rotating plate 37 facing the base plate 31 such that the second sheet coil 46 is arranged on the inner side.

A third sheet coil 48 comprising an excitation coil 47 opposite to the detecting coil 42 is stored in the sheet-coil-holding groove 35 on the opposite face of the base plate 31 facing the rotating plate 37, and a fourth sheet coil 50 comprising a secondary coil 49 of an output transformer 44 facing the primary coil 45 of the output transformer 44 is similarly stored in the sheet-coil-holding groove 36.

Namely, the third and fourth sheet coils 48, 50 are concentrically arranged around the small diameter axis 17a on the opposite face of the base plate 31 facing the rotating plate 37 such that the fourth sheet coil 50 is arranged on the inner side.

As shown in FIG. 3, the first sheet coil 43 is formed by providing the detecting coil 42 on the one side of the substrate 43a in the same way with a printed wiring, wherein the substrate 43a consists of an insulating base plate or sheet such as a prepreg, and wherein the detecting coil 42 is formed in an irregular pattern meandering in the inside-outside direction such that a profile of a spur gear is traced.

The second sheet coil 46 is formed by providing the primary coil 45 on the one side of the substrate 46a in the same way with a printed wiring, wherein the primary coil 45 has a spiral pattern around the small diameter axis 17a, and wherein the substrate 46a is made of the same material with the substrate 43a.

The excitation coil 47 of the third sheet coil 48 consists of the first and second excitation coils 47a, 47b such that the phases of the electrical angle of them are different from each other, such as 90°.

Namely, the third sheet coil 48 is formed by providing the first excitation coil 47a on the one side of the substrate 48a in the same way with a printed wiring, and by providing the second excitation coil 47b having the same shape as the first excitation coil 47a on the other side of the substrate 48a, wherein the substrate 48a is made of the same material with the substrate 43a, wherein the first excitation coil 47a is formed in the same pattern as the detecting coil 42 such that a profile of a spur gear is traced, and wherein the second excitation coil 47b is arranged such that the phase of the electrical angle of it is differentiated from that of the first excitation coil 47a by shifting the angles between them around the small diameter axis 17a.

The fourth sheet coil 50 is formed by providing the secondary coil 49 on the one side of the substrate 50a in the same way with a printed wiring, wherein the secondary coil 49 has the same spiral pattern as the primary coil 45 around the small diameter axis 17a, and wherein the substrate 50a is made of the same material with the substrate 43a.

In FIGS. 2 and 3, for easily understanding, each coil 42, 45, 47 (47a, 47b), 49 of the first to fourth sheet coils 43, 46, 48, 50 is schematically shown such that each coil is apart from the respective substrates 43a, 46a, 48a, 50a. Actually, because each coil 42, 45, 47 (47a, 47b), 49 is print-wired on the respective substrates 43a, 46a, 48a, 50a, each thickness of them is remarkably small.

Moreover, each coil 42, 45, 47 (47a, 47b), 49 of the first to fourth sheet coils 43, 46, 48, 50 is arranged one by one per one plain face, thereby the resolver 30 can be considerably made thin.

Because the base plate 31 and the rotating plate 37 are respectively made of iron, each vicinity part of the sheet-coil-holding grooves 35, 36, 40, 41 in the base plate 31 and the rotating plate 37 operate as iron cores.

Next, with referring to the block diagram shown in FIG. 4, the formation and the operation of the controller 5 are explained.

As shown in FIG. 4, the detecting coil 42 and the primary coil 45 arranged on the rotating plate 37 which is a rotor of the resolver 30 are coupled in series and are made to be a closed-loop-like structure.

The first and second excitation coils 47a, 47b arranged on the base plate 31 which is a stator of the resolver 30 are respectively coupled to a first and second input circuits 53, 54 of the input circuit 52 of the resolver control circuit 51. A modulation signal S1 is applied to the first excitation coil 47a from the first input circuit 53, wherein the modulation signal S1 is obtained by amplitude modulating a high frequency signal. A modulation signal S2 is applied to the second excitation coil 47b from the second input circuit 54, wherein, the modulation signal S2 is obtained by amplitude modulating a high frequency signal so that the electrical angle of it is differentiated from that of the modulation signal S1, for example 90°.

When the rotating plate 37 is rotated with the rotation axis 17 of the electric motor 18 in the state that the modulation signals S1, S2 are respectively applied to the first and second excitation coils 47a, 47b; a synthetic voltage induced by the modulation signals S1, S2 is generated as an output signal SO on the detecting coil 42. The output signal SO is applied to an output circuit 55 by an output transformer 44 comprising the primary and secondary coils 45, 49.

In the output processing circuit 55, the output signal SO is demodulated by a high-frequency-signal isolating circuit (not shown) and a temperature is corrected by a correction circuit (not shown) so that the output signal SO is output as an angle detection signal SA. The angle detection signal SA is applied to an angle control circuit 58 of a motor control circuit 57 by an A/D converter 56.

Regarding specific devices and methods for generating the modulation signals S1, S2 at the first and second input circuits 53, 54 of the input circuit 52, and for demodulating and correcting the output signal SO at the output processing circuit 55; because they are well-known by JP 2000-292205 A, etc. and do not directly concern the present invention, the drawings of them are omitted.

By the angle control circuit 58 of the motor control circuit 57, the exact positions of the piston 10 and the second brake pad 11 are calculated based on the angle detection signal SA applied from the output processing circuit 55 of the resolver control circuit 51, a moving speed of the second brake pad 11 is calculated based on the information of the positions and on a moving time shown by a timer (not shown), and the information of the speed is stored in a memory (not shown) and is applied, to a motor operating circuit 61 of the motor control circuit 57 as an angle control signal SAc.

As shown in FIG. 4, the output signal from the load sensor 24 is applied to a torque control circuit 60 of the motor control circuit 57 as a torque detection signal ST by an A/D converter 59.

At the torque control circuit 60, a clamping force to the brake disk 2 by the brake pads 7, 11 is calculated based on the torque detection signal ST applied from the load sensor 24. The consequence is applied to the motor operating circuit 61 as a torque control signal STc.

Namely, because the torque detection signal ST applied from the load sensor 24 is approximately proportional to the clamping force to the brake disk 2 by the brake pads 7, 11; it is possible to calculate the clamping force to the brake disk 2 by the brake pods 7, 11 from the torque detection signal ST.

Although the electric motor 18 has been conventionally controlled to stop by detecting the increase of the current value of the electric motor 18, this control is replaced by the torque control circuit 60. Conventionally, the damping force to the brake disk 2 by the brake pads 7, 11 was not always proportional to the increase of the current value of the electric motor 18, and there was a risk that the operation of the electric motor 18 was stopped in the state of the insufficient clamping force to the brake disk 2 by the brake pads 7, 11. The actual loading corresponding to the clamping force to the brake disk 2 by the brake pads 7, 11 is detected in real time according to the operation from the load sensor 24 to the torque control circuit 60, and thereby the electric motor 18 can be quickly operated by a feedback control. Thus, it is possible to prevent stopping the operation of the electric motor 18 in the state of the insufficient clamping force to the brake disk 2 by the brake pads 7, 11, and the operation of the electric motor 18 can be more precisely controlled.

Incidentally, it is possible that the control system of this embodiment in which the electric motor 18 is controlled based on the detection of the clamping force to the brake disk 2 by the brake pads 7, 11 with using the torque control circuit 60 is combined with the conventional control system in which the electric motor is stopped by the increase of the current value of the electric motor 18.

The motor operating circuit 61 is coupled to the angle control circuit 58, the torque control circuit 60, and the operating means 62 which is a parking brake lever, a parking brake pedal or a parking brake switch, etc. such that an on/off of the electric motor 18 is controlled by the operation of the operating means 62, that the position and the moving speed of the piston 10 and the second brake pad 11 are controlled by the angle control circuit 58, and that the clamping force to the brake disk 2 by the brake pads 7, 11 is controlled by the torque control circuit 60.

Figure 5:
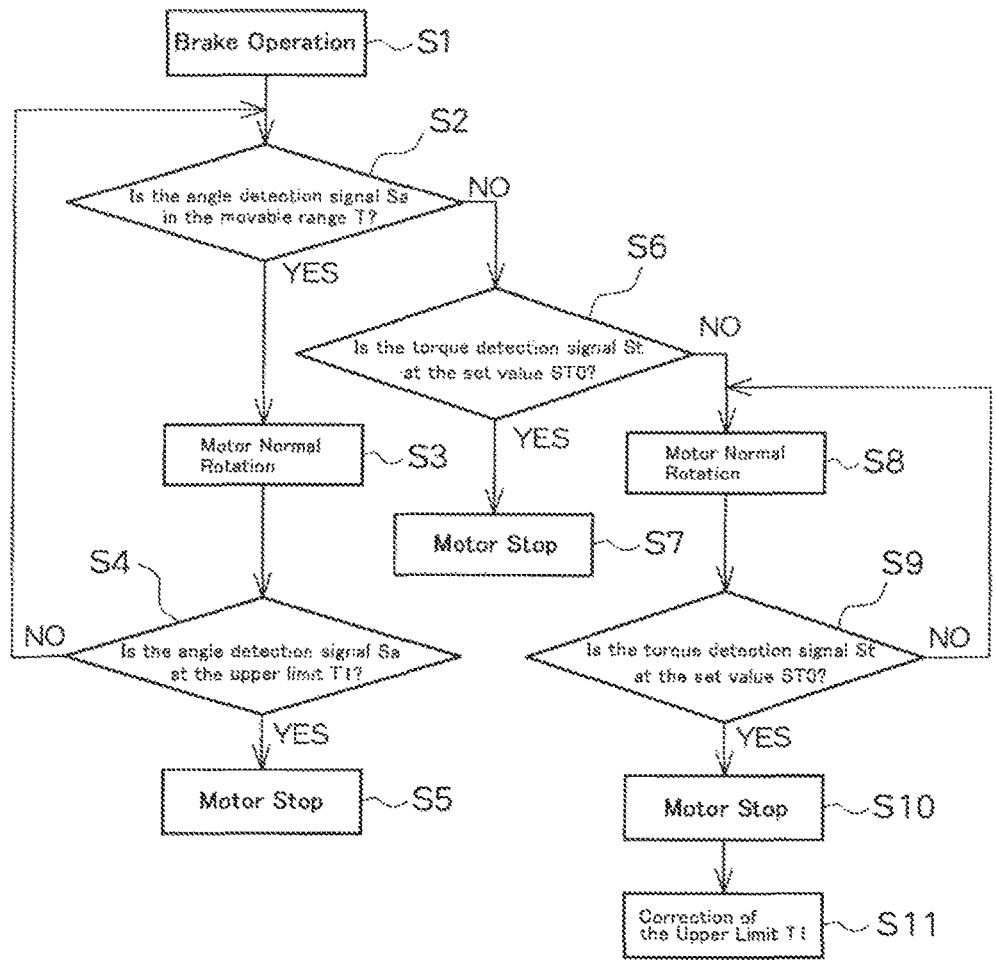
FIG. 5 is a flowchart showing an example of an operation mode at the time of a brake operation in the first embodiment.
Figure 6:
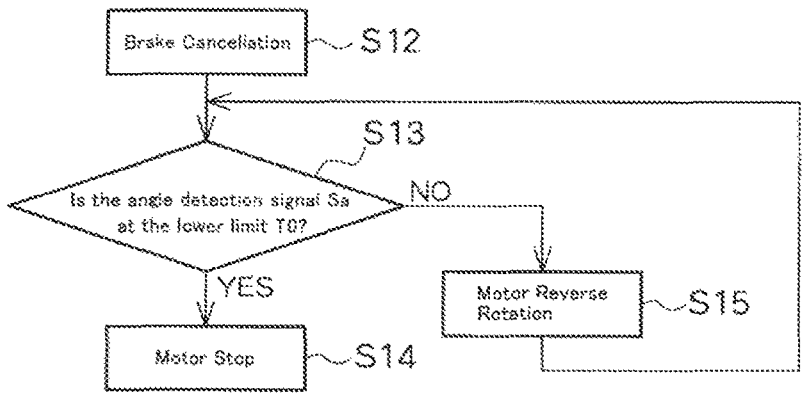
FIG. 6 is a flowchart showing an example of an operation mode at the time of a brake release in the first embodiment.

Next, according to flowcharts shown in FIGS. 5 and 6, an example of the basic operation of the electric motor 18 is explained.

As shown in FIG. 5, when a brake operation signal is applied to the motor operating circuit 61 by the operating means 62 (S1); under the condition that the position of the piston 10 calculated based on the angle detection signal SA by the angle control circuit 58 is in a preset movable range T (S2), the electric motor 18 is rotated in the direction of advancing the piston 10 (the rotation in this direction is called as "normal rotation" below) (S3); and under the condition that the angle detection signal SA indicating the piston 10 reaches to the upper limit T1 of the movable range T (S4), the normal rotation of the electric motor 18 is stopped (S5).

During these steps, the second brake pad 11 comes into contact with the brake disk 2 by the advance of the piston 10, and then the first brake pad 7 comes into contact with the brake disk 2 so that the brake disk 2 is pressed by the optimum clamping force by the both brake pads 7, 11. This is apparent from the explanation below.

When the piston 10 is not in the preset movable range T in the step (S2); under the condition that the torque detection signal ST reaches to the preset set value ST0 corresponding to the optimum clamping force to the brake disk 2 (S6), the electric motor 18 is maintained as stopped (S7); on the other hand, under the condition that the torque detection signal ST does not reach to the set value ST0 in the step (S6), the electric motor 18 is normally rotated (S8); and under the condition that the torque detection signal ST reaches to the set value ST0 (S9), the electric motor 18 is stopped (S10), and the upper limit T1 of the movable range T of the angle detection signal SA indicating the piston 10 is corrected based on the angle detection signal SA indicating the piston 10 at this time (S11).

Therefore, when the angle detection signal SA indicating the piston 10 reaches to the upper limit T1 of the movable range T, the brake disk 2 is always pressed by the optimum clamping force.

As shown in FIG. 6, when the brake cancellation signal is applied to the motor operating circuit 61 by the operating means 62 (S12); under the condition that the piston 10 calculated based on the angle detection signal SATs positioned at the lower limit T0 of the movable range T, that is, the restoring position (S13), the electric motor 18 is maintained as stopping (S14); under the condition that the piston 10 is not positioned at the lower limit T0 of the movable range T, the electric motor 18 is reversed (S15); and under the condition that the piston 10 reaches to the lower limit T0 of the movable range T (S13), the electric motor 18 is stopped (S14).

The above operation is a mere example. The electric motor 18 can be controlled by any way according to the setting.

According to the first embodiment, the resolver 30 can be made thin as a whole by making the coil parts with the sheet coils, thereby the resolver 30 can be substantially installed in the electric parking brake, and the clamp position, the clamp speed, etc. of the brake pads 7, 11 for the brake disk 2 can be controlled.

Incidentally, although the control of the clamp speed is not explained above, the clamp speed for the brake disk 2 by the brake pads 7, 11 can be controlled by using a DC motor which can be numerically controlled as the electric motor 18 and by detecting the moving speed of the piston 10, wherein the moving speed can foe calculated by detecting the position of the piston 10 correctly with the resolver 30 and by combining the resolver 30 and a timer (not shown).

In the case that a battery goes flat in an emergency and then restores, the electric motor 18 can be quickly and correctly controlled based on the information preserved in a memory in which the position information, etc. of the piston 10 detected by the resolver 30 is stored.

Figure 7:
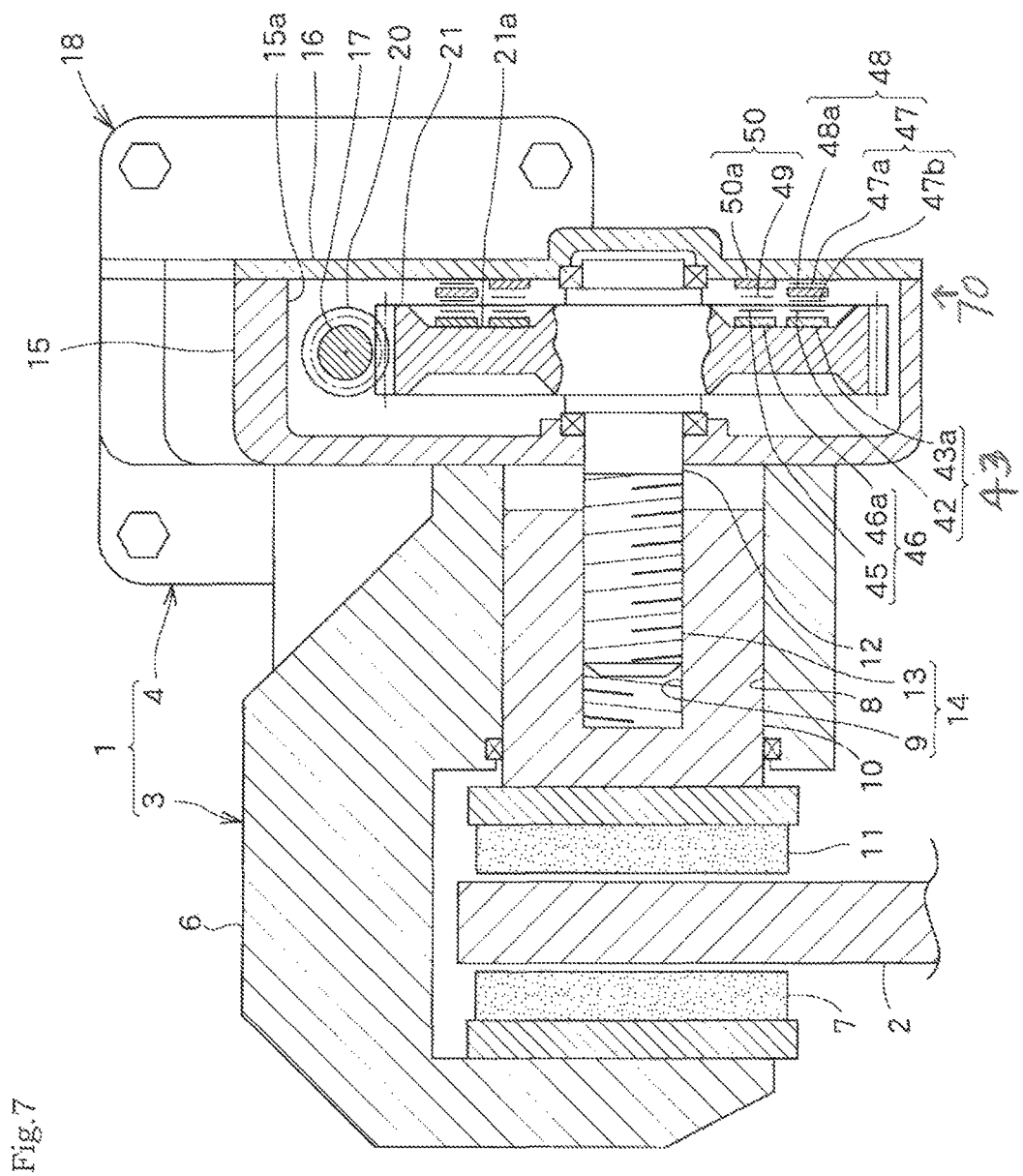
FIG. 7 is a schematic vertical sectional front view showing a resolver installing portion of a second embodiment of an electric parking brake device of the present invention.

FIG. 7 is a schematic vertical sectional front view showing a resolver installing portion of a second embodiment of the electric parking brake device of the present invention.

In the second embodiment, the worm wheel 21 in the housing 15 is used as a rotor, the cover plate 16 is used as a stator, and the resolver 70 is arranged between them.

Namely, in the same way as the resolver 30, the resolver 70 has the first to fourth sheet coils 43, 46, 48 and 50, wherein the first sheet coil 43 is formed by providing the detecting coil 42 on the one side of the substrate 43*a* and is arranged at the peripheral part side on the bottom face of the circular concavity 21*a* around the output shaft 12 formed at the center of the lateral surface of the worm wheel 21 as the rotor, wherein the second sheet coil 46 is formed by providing the primary coil 45 of the output transformer 44 on the one side of the substrate 46*a* and is arranged at the central part side on the bottom face of the same circular concavity 21*a*, wherein the third sheet coil 48 is formed by providing the first and second excitation coils 47*a*, 47*b* respectively on the one side and the other side of the substrate 48*a* and is arranged at the peripheral part side of the opposite face of the cover plate 16 feeing the bottom face of the concavity 21*a*, and wherein the fourth sheet coil 50 is formed by providing the secondary coil 49 of the output transformer 44 on the one side of the substrate 50*a* and is arranged at the central part side on the opposite face of the cover plate 16 feeing the bottom face of the concavity 21*a*.

According to the second embodiment, the resolver 70 affects and has effects in the same way as the resolver 30. Moreover, because the resolver 70 is arranged between the cover plate 16 composing a part of the housing 15 of the electrical actuator 4 and the worm wheel 21 rotated so as to be decelerated than the rotation axis 17 of the electric motor 18, the risk of receiving a thermal effect such as heat generation of the electric motor 18 is small, and the resolver 70 also has an effect so that it can be easily installed into a conventional electrical actuator without changing the formation.

The present invention is not restricted to the above embodiments, and various modifications may be added to the present invention unless deviating from the scope of Claims as follows.

(1) In addition to the interval between the rotation axis 17 of the electric motor 18 and the motor housing 19 (the first embodiment), and the interval between the worm wheel 21 and the cover plate 16 (housing 15) (the second embodiment); the resolver can be arranged between the housing of the decelerating means and a shaft rotating synchronously with the rotation axis 17 of the electric motor 18, such as a shaft of an intermediate gear in the case that the decelerating means consists of a gear train.

(2) The decelerating means can consist of a gear train as an alternative to consisting of the worm 20 and the worm wheel 21.

(3) The power conversion means 14 converting the rotational movement of the rotation axis 17 of the electric motor 18 to the linear movement can be formed by a rotating cam and a cam follower or by a piston crank mechanism, etc., in addition to the formation consisting of the female screw hole 9 of the piston 10 and the male screw 13 of the output shaft 12.

What is claimed is:

1. An electric parking brake device comprising an electric motor, a pressing member, and brake pads, wherein a rotational speed of a rotation shaft of the electric motor installed in a motor housing is decelerated and a rotational movement of the rotation shaft is converted to a linear movement so as to be transmitted to the pressing member, wherein a brake disk rotating with a wheel is pressed with the brake pads biased by the pressing member so that a braking force is affected to the wheel, and wherein the electric motor is controlled by a controller;

the electric parking brake device further comprising a resolver which has a rotating plate which is fixed to the rotation shaft of the electric motor, a base arranged in a resolver housing so as to face the rotating plate, a first sheet coil comprising a detecting coil and arranged on an opposite face of the rotating plate so as to face the base, a second sheet coil comprising a primary coil of an output transformer and arranged on the opposite face of the rotating plate so as to face the base, the primary coil being coupled to the detecting coil, a third sheet coil comprising an excitation coil opposite to the detecting coil and arranged on the opposite face of the base so as to face the rotating plate, and a fourth sheet coil comprising a secondary coil of the output transformer opposite to the primary coil of the output transformer and arranged on the opposite face of the base so as to face the rotating plate, wherein the controller has a resolver control circuit comprising an input circuit for inputting an excitation signal to the excitation coil of the resolver and an output circuit for processing an output signal occurring from the secondary coil of the output transformer, and a motor control circuit for controlling the electric motor based on an output from the output circuit of the resolver control circuitry, wherein a load sensor is arranged so as to be in pressure contact with an end of the rotation shaft in order to detect a thrust load of the rotation shaft, wherein a torque control circuit for calculating a clamping force to the brake disk by the brake pads based on a torque detection signal given from the load sensor is installed in the controller, and wherein the electric motor is controlled by the motor control circuit based on output from respective of the torque control circuit and the output circuit of the resolver control circuit.

2. The electric parking brake device according to claim 1, wherein the first to fourth sheet coils respectively further comprises a substrate consisting of an insulating base plate or sheet, and said respective coils of the first to fourth sheet coils are arranged one by one per one plain face of the respective substrates.

3. The electric parking brake device according to claim 1, wherein the first and second sheet coils are respectively opposite to the third and fourth sheet coils, and these sheet coils are concentrically arranged around a shaft rotating the rotating plate.

4. The electric parking brake device according to claim 1, wherein the excitation coil consists of a first and second excitation coils which are respectively disposed on the front and rear surfaces of the third sheet coil, and wherein modulation signals are respectively applied to the first and second excitation coils such that a phase difference of an electrical angle is generated between the first and second excitation coils.

5. The electric parking brake device according to claim 1, wherein the deceleration of the rotational speed of the rotation shaft of the electric motor is performed by a decelerating means comprising a worm and a worm wheel, wherein the worm is formed in the rotation shaft, and the worm wheel engages with the worm and is connected to a power conversion means for converting the rotational movement of the rotation shaft to the linear movement, wherein the power conversion means is constructed from a male screw formed on an output shaft to which the worm wheel is fixed and a female screw formed in the pressing member, and wherein the load sensor is installed in a housing for the worm and the worm wheel.

6. The electric parking brake device according to claim 1, wherein the motor control circuit comprises the torque control circuit, an angle control circuit into which an angle detection signal output from an output processing circuit of the resolver control circuit is input, and a motor operating circuit for controlling the electric motor based on output from respective of the torque control circuit and the angle control circuit, wherein an on/off of the electric motor is controlled by an operation of an operating member connected to the motor operating circuit, wherein a position and a moving speed of the pressing member and the brake pad provided thereon are controlled by the angle control circuit connected to the motor operating circuit, and wherein a clamping force to the brake disk by the brake pads is controlled by the torque control circuit connected to the motor operating circuit.

7. The electric parking brake device according to claim 1, wherein the motor control circuit comprises the torque control circuit, an angle control circuit into which an angle detection signal output from an output processing circuit of the resolver control circuit is input, and a motor operating circuit for controlling the electric motor based on output from respective of the torque control circuit and the angle control circuit, wherein when a brake operation signal is applied to the motor operating circuit by an operating member connected to the motor operating circuit, the motor control circuit operates the electric motor according to any of the following modes (1) to (3):

(1) a mode in where when the angle detection signal is in a preset range, the electric motor is rotated in a direction of a brake operation and is stopped under a condition that the angle detection signal reaches to a preset upper limit, (2) a mode in where when the angle detection signal is not in the preset range and the torque detection signal is in a condition that it reaches to a preset set value of a clamping force to the brake disk, the electric motor is maintained as stopped, and (3) a mode in where when the angle detection signal is not in the preset range and the torque detection signal is not in the condition that it reaches to said preset set value of the clamping force to the brake disk, the electric motor is rotated in the direction of the brake operation and is stopped under a condition that the torque detection signal reaches to said preset set value of the clamping force, and the upper limit of the range of the angle detection signal is corrected based on the angle detection signal at this time.

8. The electric parking brake device according to claim 1, wherein circular sheet-coil-holding grooves of which diameters are different from each other are concentrically formed on a surface facing the rotating plate on the base such that a bottom face of the inner sheet-coil-holding groove is arranged nearer to the rotating plate than a bottom face of the outer sheet-coil-holding groove, and wherein circular sheet-coil-holding grooves of which diameters are different from each other are concentrically formed on a surface facing the base on the rotating plate such that a bottom face of the outer sheet-coil-holding groove is arranged nearer to the base than a bottom face of the inner sheet-coil-holding groove.

9. The electric parking brake device according to claim 1, wherein the deceleration of the rotational speed of the rotation shaft of the electric motor is performed by a decelerating means comprising a worm and a worm wheel, wherein the worm is formed in the rotation shaft, and the worm wheel engages with the worm and is connected to a power conversion means for converting the rotational movement of the rotation shaft to the linear movement, wherein the power conversion means is constructed from a male screw formed on an output shaft to which the worm wheel is fixed and a female screw formed in the pressing member, and wherein the rotating plate consists of the worm wheel, and a part of a housing for the worm and the worm wheel is utilized as the base.

10. The electric parking brake device according to claim 1, wherein the deceleration of the rotational speed of the rotation shaft of the electric motor is performed by a decelerating means comprising of a gear train, wherein the rotating plate is fixed to a shaft of an intermediate gear of the gear train, and wherein a part of a housing for the gear train is utilized as the base.

11. The electric parking brake device according to claim 1, wherein the detecting coil of the first sheet coil and the excitation coil of the third sheet coil are respectively formed in an irregular pattern meandering in the inside-outside direction such that a profile of a spur gear is traced.

* * * * *